United States Patent [19]

Nishimura

[11] Patent Number: 4,551,601
[45] Date of Patent: Nov. 5, 1985

[54] HEAT COOKING APPARATUS WITH TEMPERATURE OPERATING SYSTEM

[75] Inventor: Nobuichi Nishimura, Aichi, Japan

[73] Assignee: Kabushiki Kaisha Toshiba, Tokyo, Japan

[21] Appl. No.: 597,752

[22] Filed: Apr. 6, 1984

[30] Foreign Application Priority Data

Jul. 11, 1983 [JP] Japan ................... 58-125933

[51] Int. Cl.$^4$ ............................................. H05B 9/06
[52] U.S. Cl. ........................ 219/10.55 B; 219/10.55 M; 219/490; 219/492
[58] Field of Search .................. 219/10.55 B, 10.55 M, 219/10.55 R, 10.55 F, 490, 492, 494, 502, 506; 340/365 R, 365 S; 99/DIG. 10

[56] References Cited

U.S. PATENT DOCUMENTS

| | | | |
|---|---|---|---|
| 4,343,990 | 8/1982 | Ueda | 219/10.55 B X |
| 4,347,418 | 8/1982 | Nobue et al. | 219/10.55 B |
| 4,383,157 | 5/1983 | Nakata et al. | 219/10.55 B |
| 4,415,887 | 11/1983 | Kawase | 219/10.55 D X |

FOREIGN PATENT DOCUMENTS 54-21857 2/1979 Japan.
57-134630 8/1982 Japan.
57-42817 9/1982 Japan.

Primary Examiner—Roy N. Envall, Jr.
Assistant Examiner—M. M. Lateef
Attorney, Agent, or Firm—Schwartz, Jeffery, Schwaab, Mack, Blumenthal & Evans

[57] ABSTRACT

A heat cooking apparatus with a temperature operating system, wherein a microcomputer detects an abnormality of a temperature sensor and de-energizes the cooking apparatus to stop cooking while also producing a sensor fault pulse signal. Upon counting of a predetermined number of sensor fault pulse signals in a counter, the microcomputer generates a sensor defect signal to alert the user of the defective temperature sensor. Spurious fault conditions are ignored by resetting the counter upon proper operation of the sensor before reaching the predetermined number of sensor fault pulse signals.

18 Claims, 9 Drawing Figures

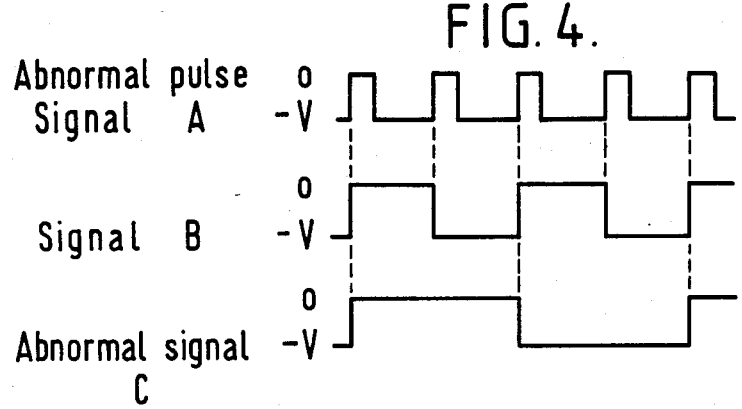
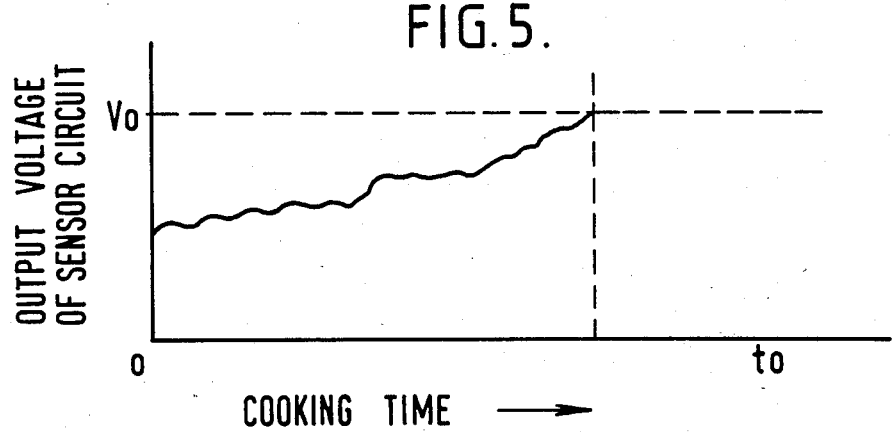
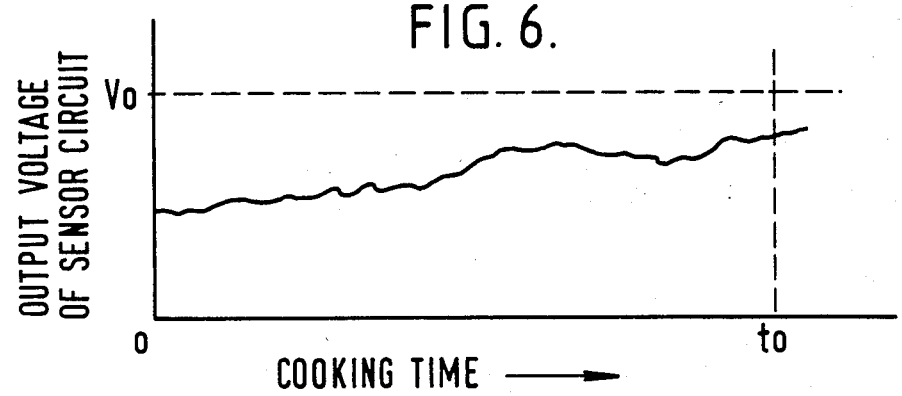

HEAT COOKING APPARATUS WITH TEMPERATURE OPERATING SYSTEM

BACKGROUND OF THE INVENTION

The present invention relates to a heat cooking apparatus, more specifically, to an improvement in a heat cooking apparatus employing a microprocessor for the purpose of controlling the heating of materials and a method of controlling same. A microwave oven is well known as an example of a heat cooking apparatus. Lately, microprocessors have been employed in such microwave ovens for the purpose of performing various cooking functions to achieve a simple circuit configuration with simple operator manipulation.

Conventionally, it is possible to control a heat cooking apparatus in response to the temperature of materials being cooked, as shown, for example, in U.S. Pat. Nos. 4,347,418 and 4,383,157. For such cooking apparatus, a temperature measuring means is employed, as, for example, an infrared radiation detecting device. The microprocessor controls the heat cooking operation to deenergize the heating apparatus and to adjust the output of the heating energy during operation thereof in response to a signal from the temperature measuring means. The temperature measuring means (sensor) is very sensitive, and may malfunction in use resulting from steam in the cooking apparatus. When the cooking apparatus does not de-energize and stop the cooking operation in response to sensed temperature because of a defect in the sensor, the heating is nevertheless terminated at a default time provided as a safety back-up, as shown, for example, in Japanese Pat. No. 57-42817 published on Sept. 10, 1982.

However, a disadvantage in this apparatus is encountered since the user cannot determine whether the heating was forcibly stoppped due to a malfunctioning sensor or stopped normally in response to the food products reaching the correct temperature. Namely, when heat cooking is forcibly terminated, a user may think that the heat cooking apparatus simply does not cook very well, and not recognize that the sensor is dirty and needs cleaning.

SUMMARY OF THE INVENTION

It is a primary object of the present invention to provide a heat cooking apparatus with a temperature operating system, which informs a user of a temperature sensor abnormality or defect.

It is another object of the invention to provide means for informing the user thereof of a temperature sensor defect when the abnormality continues to occur for several times.

It is a further object of the invention to inform the user thereof of an abnormality of the temperature sensor even if the main power source is disconnected.

To accomplish the foregoing and other objects in accordance with a preferred embodiment of the invention, a heat cooking apparatus includes a control circuit means, a counter circuit means counting the number of times that cooking is forcibly terminated, and means for displaying an indication of the abnormality of the temperature sensor. The control circuit means includes a microcomputer for controlling the microwave energy. The counter circuit means receives a sensor fault signal from the microcomputer, and provides a sensor defect signal to the microcomputer when the abnormality is continued for some time. The microcomputer enables the display means to display an indication of the sensor abnormality.

The invention may also be characterized as a fault circuit for a heating apparatus comprising a sensor, a control circuit, an output control means, a counter and an output means. The sensor generates a sensor signal indicative of the temperature of products placed in the apparatus during operation thereof. The control circuit includes a microprocessor having timing means associated therewith. The control circuit is responsive to the sensor signal for comparing the sensor signal indicative temperature with a predetermined temperature and for generating a sensor fault signal if the sensor signal indicative temperature does not reach the predetermined temperature within a predetermined default time period as timed by said timing means. The output control means is connected to the control circuit and operative to de-energize the heating apparatus when the sensor fault signal is generated. The counter is connected to receive the sensor fault signal for incrementing in response thereto. The counter outputs a sensor defect signal in response to a predetermined number of sensor fault signals. The output means is provided for outputting an indication of the sensor fault in response to the sensor defect signal.

BRIEF DESCRIPTION OF THE DRAWINGS

Features of the present invention will be apparent from the following drawings, wherein:

FIG. 4 is a graph showing waveforms for describing the operation of the counter circuit means shown in FIG. 3;

FIG. 5 is a graph showing an output signal of a sensor circuit in normal operation;

FIG. 6 is a graph showing an output signal of the sensor circuit in abnormal operation;

DESCRIPTION OF THE PREFERRED EMBODIMENT

Figure 1:
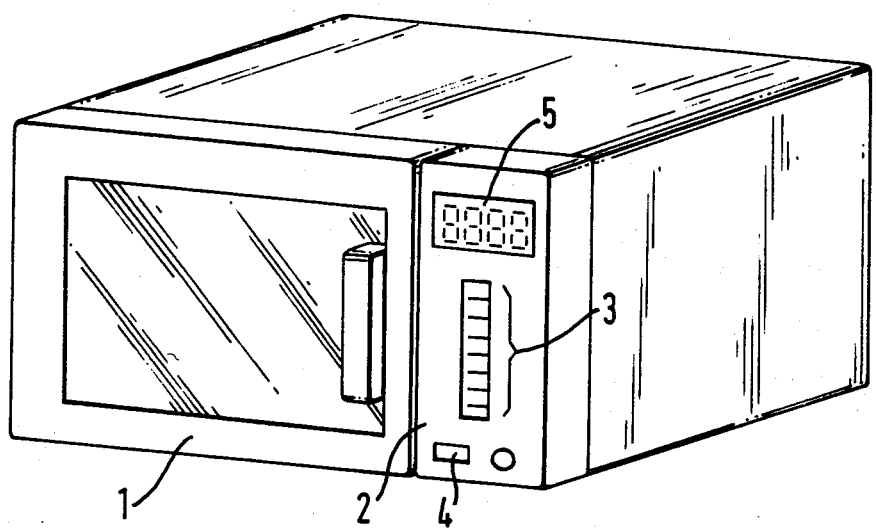
FIG. 1 is a perspective view of a heat cooking apparatus with the temperature operating system of the present invention.

Referring to the drawings, a heat cooking apparatus shown in FIG. 1 has a door 1 and a control panel 2. The control panel 2 includes auto-cooking menu keys 3, a start key 4, and a display means 5. Automatic cooking may be accomplished using a microcomputer and a sensor by selecting the menu using the auto-cooking menu keys 3.

Figure 2:
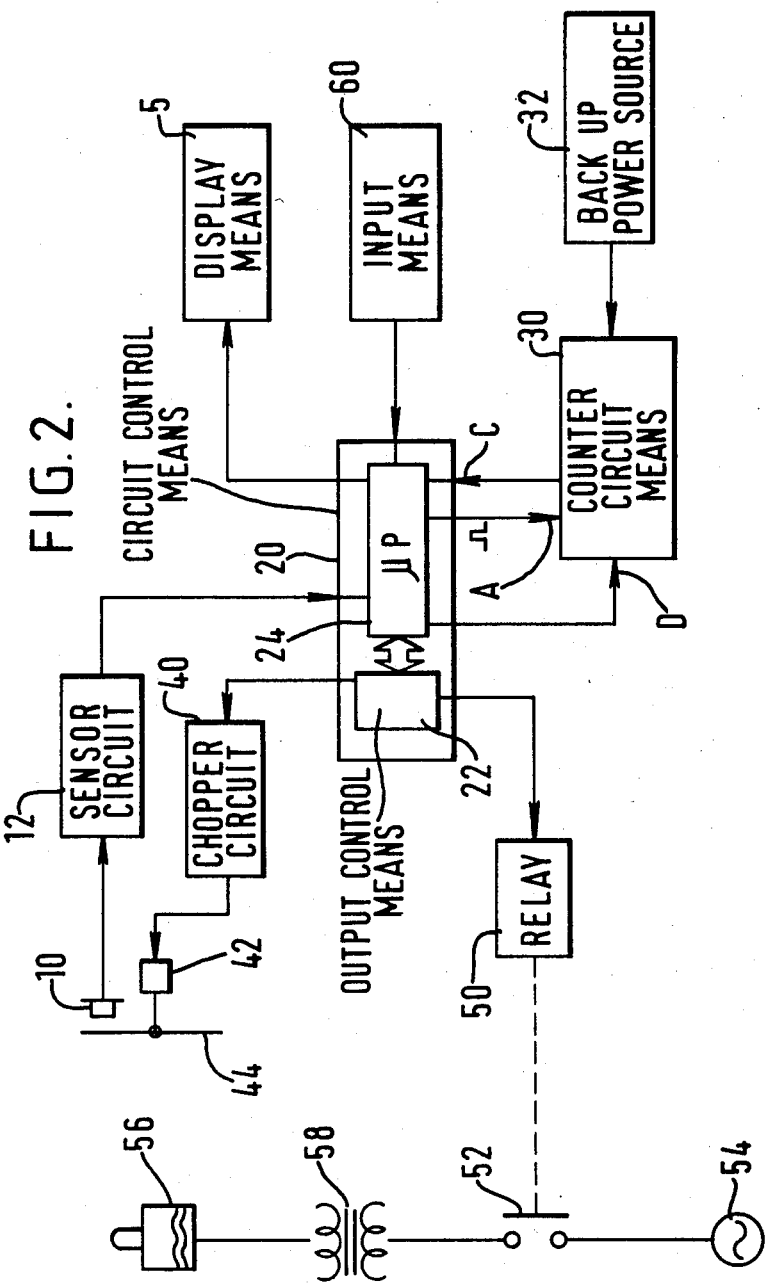
FIG. 2 is a block diagram showing a circuit configuration of an embodiment of the invention.

In FIG. 2, showing an embodiment of a circuit configuration of the invention, the heat cooking apparatus is seen to have an infrared sensor 10, a control circuit means 20, and a counter circuit means 30. The sensor 10 is connected to the control circuit means 20 through a sensor circuit 12. Control circuit means 20 provides a chopper circuit 40 with a signal for controlling a chopper motor 42 to rotate a chopper plate 44. Chopper plate 44 intermittently interrupts sensor 10 by rotating between the sensor and food products, thereby interrupting infrared rays emanating from the food being cooked. The use of the chopper circuit with the infrared sensor is similar to that described in U.S. Pat. No. 4,347,418.

Control circuit means 20 includes an output control means 22 and a microcomputer 24. Microcomputer 24 has the normal timing means for maintaining the cooking interval time period which causes de-energization of the oven after expiration of the desired cooking time period. Microcomputer 24 receives the sensor signal which is recitfied in sensor circuit 12, and the microcomputer 24 is futher connected to the output control means 22. The output control means 22 produces control signals for the chopper circuit 40 and a relay circuit 50.

The relay circuit 50 controls microwave energy by a relay contactor 52 in response to the control signals of output control means 22. The relay contactor 52 is connected between a commercial power source 54 and a magnetron 56 through a transformer 58.

The counter circuit means 30 receives sensor fault pulse signal A and a reset signal D from microcomputer 24, and provides it with a sensor defect signal C. A back-up power source 32 is connected to the counter circuit means 30. The microcomputer 24 inputs a cooking control information signal from an input means 60 by auto-cooking menu keys 3, and enables display means 5 to display the menu selected by keys 3 or inform the operator of an abnormality of the sensor 10.

Figure 3:
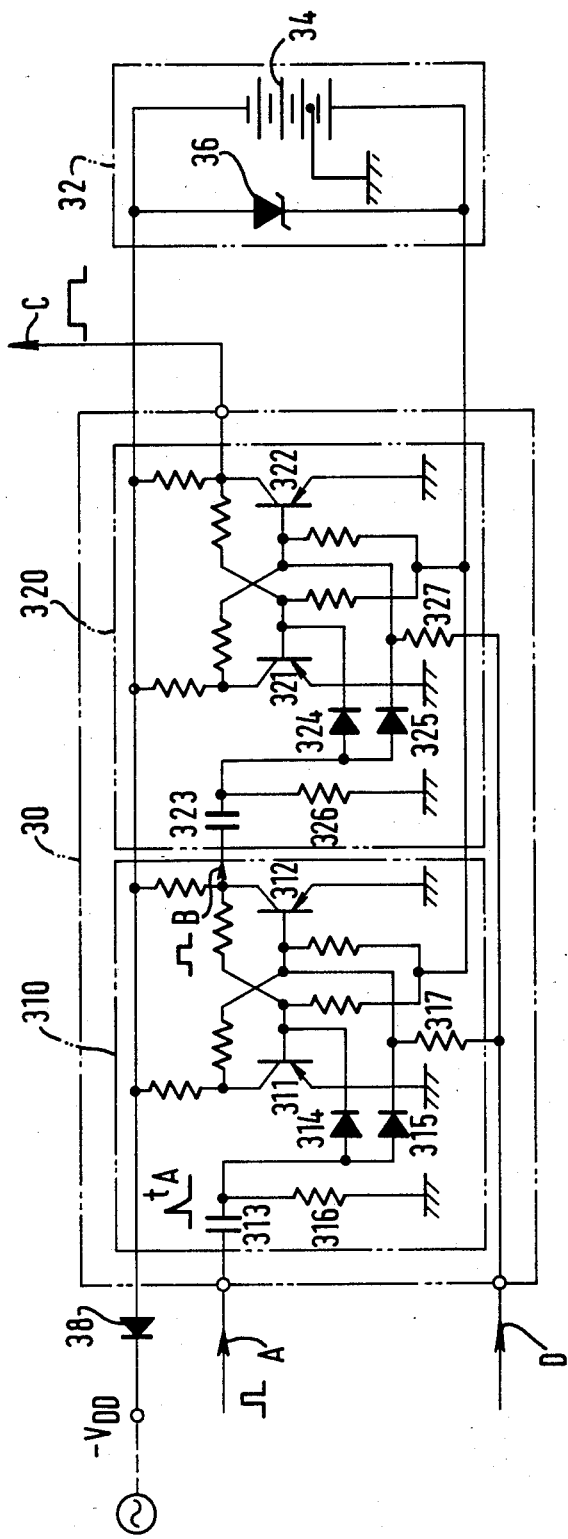
FIG. 3 is an embodiment of a circuit diagram showing details of the counter circuit means and a power source of FIG. 2.

The counter circuit means 30 and the back-up power source 32 are described in detail in FIG. 3. The counter circuit means 30 includes two flip-flop circuits 310 and 320. The circuits 310 and 320 are connected in series to a DC power supply $-V_{DD}$ that is derived from power source 54, and the back-up power source 32. The flip-flop circuit 310 inputs the sensor fault pulse signal A from the microcomputer 24, and produces a pulse signal B for the circuit 320 by binary counting. The flip-flop circuit 310 includes PNP-type transistors 311, 312, a condenser 313, diodes 314, 315, and a plurality of resistors connected as shown in FIG. 3. The flip-flop circuit 320 has the same configuration as the flip-flop circuit 310. The flip-flop circuit 320 produces a pulse signal C as the sensor defect signal by binary counting, as shown in FIG. 4. In short, one sensor defect signal C is produced from four pulses of the sensor fault pulse signal A. The sensor defect signal C is produced periodically in response to the rising edge of the fifth pulse of the signal A. The signal D from the microprocessor 24 is provided to each flip-flop circuit 310, 320 as a reset signal.

It is clear that a counter circuit, such as, counter circuit means 30, may be configured to count any number of pulses. Generally, the predetermined number of sensor fault pulse signals should be at least greater than two and optimally is five, although other optimal choices are, of course, possible.

The back-up power source 32 includes a storage battery 34 and a Zener diode 36. The storage battery 34 is made of a nickel-cadmium battery that is able to be charged through the power supply $-V_{DD}$. The diode 36 is connected with the battery 34 in parallel to prevent the battery 34 from being over-charged. A diode 38 prevents other circuits from affecting back-up power source 32.

An explanation will be made hereinafter as to how the control circuit means operates, referring to FIGS. 5 through 8.

At first, a cooking menu selected by the autocooking keys 3 is set in the microcomputer 24 by the input means 60 after preparing materials to be cooked and placing them in the oven. When the start key 4 is pushed after closing door 2, the microcomputer 24 inputs a cookstarting signal from the input means 60, and provides a start signal to the output control means 22. The output control means 22 controls the relay circuit 50 so that the relay contactor 52 turns on, thus closing the circuit to the magnetron 56. Magnetron 56 is thus energized. At the same time, the output control means 22 controls chopper circuit 40 to drive the chopper plate 44 by chopper motor 42.

During cooking, the sensor 10 intermittently receives infrared rays from the food products through the chopper plate 44. The sensor 10 produces a signal in response to the intermittent infrared rays, and the signal is processed in the sensor circuit 12 for input to the circuit control means 20. The output voltage signal of sensor circuit 12, shown in FIG. 5, is provided to the microcomputer 24 to control the microwave energy. The microcomputer 24 determines the temperature of the materials being cooked, using the output voltage signal of sensor circuit 12, and controls the relay circuit 50 according to the detecting temperature. As shown in FIG. 5, if the output voltage signal of sensor circuit 12 reaches a voltage $V_o$, which is predetermined in the memory of the microcomputer 24 in correspondence with the auto-cooking menu keys 3, the microcomputer 24 provides a stop signal to the relay circuit 50 to turn off (open) the contactor 52. Thus, the magnetron 56 is de-energized and cooking is terminated.

However, if the sensor 10 is polluted or no longer sensitive from long use, the output voltage signal may not be able to reach the predetermined voltage $V_o$, even though a safety time $t_o$ has passed, such as shown in FIG. 6. The safety time $t_o$ is respectively predetermined in the microcomputer 24 according to the auto-cooking menu keys 3. In this case, the microcomputer 24 determines that the sensor 10 is defective, and immediately stops energization of the magnetron 56. Further, the microcomputer 24 provides one sensor fault pulse signal A for the counter circuit means 30. The counter circuit means 30 counts the number of the pulse of signal A. The counting operation is straightforward. Flip-flop circuit 310 responds to a first pulse of signal A to produce a trigger pulse $t_A$ generated by a differential circuit consisting of a condenser 313 and a resistor 316. Transistor 311 turns OFF in response to the trigger pulse $t_A$ through diode 314. Transistor 312 turns ON, and pulse B is generated. In the same way, transistor 312 turns OFF by a second pulse of signal A. Flip-flop circuit 320 has the same operation as flip-flop circuit 310, as shown in FIG. 4. Thus, if five sensor fault pulse signals A are generated, flip-flop circuit 320 produces the sensor defect signal C. The sensor defect signal C is provided to the microcomputer 24 which controls the display means 5 to display the fault condition.

However, if the defect of sensor 10 is corrected before the fifth pulse of signal A, i.e., the cooking apparatus completes the normal cooking operation (FIG. 5), microcomputer 24 generates a reset pulse D for counter circuit means 30. The transistors 312, 322 are respectviely initialized by the reset pulse D through the resistors 317, 327. Namely, the counter circuit means 30 will not generate the sensor defect signal C until the occurrence of the rising edge of the fifth sensor fault pulse signal.

The self-correction of the sensor 10 may occur, for example, if dirt built-up in front of the sensor receiving window is burnt off during cooking. Further, the user may manually clean the sensor.

FIG. 7 shows an embodiment of display means 5 comprising 8-digit LED's.

Figure 7A:
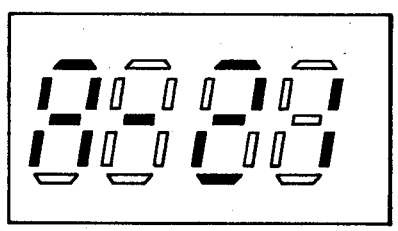
FIGS. 7(a) and 7(b) show seven-segment displaying means in accordance with a menu display and a sensor defect indication, respectively.
Figure 7B:
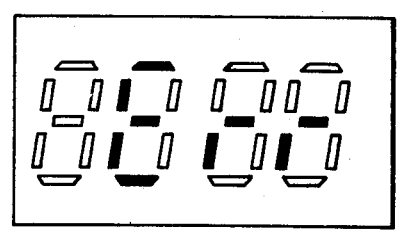

At first, when the auto key 3 is selected, display means 5 briefly displays a letter, or letter-numeral, corresponding to the menu selected by auto key 3, as shown in FIG. 7(a). The display means 5 then displays the remaining cooking time down-counted by the microcomputer 24. When microcomputer 24 receives the sensor defect signal C from counter circuit means 30, the display means 5 displays a fault message "Err" instead of the cooking time using the 8 digits as shown in FIG. 7(b).

Figure 8:
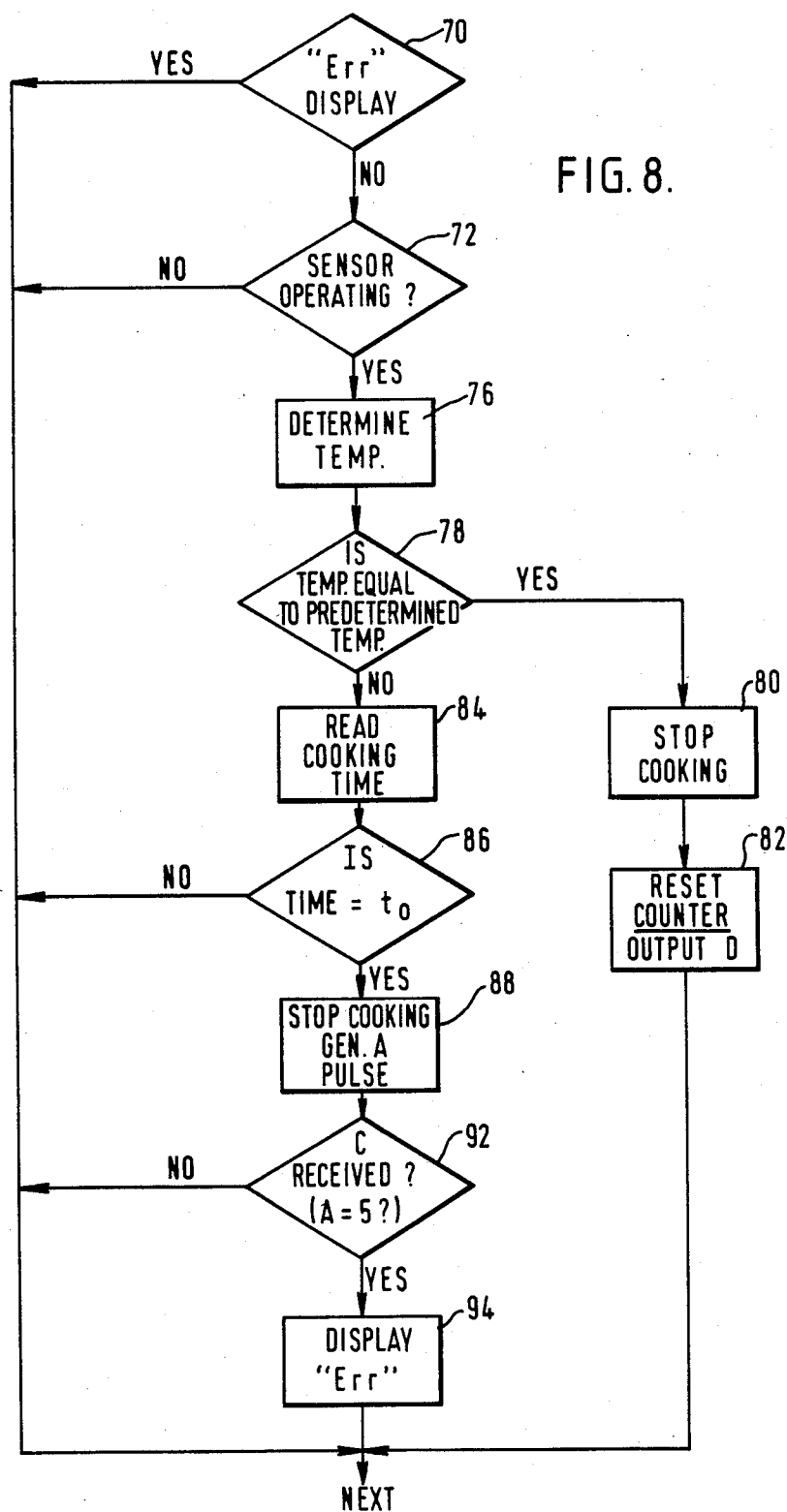
FIG. 8 is a flow chart showing the operation of the control circuit means of FIG. 2.

FIG. 8 shows a flowchart of the operation of the microcomputer 24 described hereinbefore. In step 70, the microcomputer program checks to determine if the "Err" display is being generated, and if it is not proceeds to stop 72 where the input signal from the sensor circuit 12 is read-in and examined. If this signal is present, the program goes to step 76 where the corresponding temperature value is determined via, for example, table look-up or formula techniques. In step 78, the determined temperature is compared with the predetermined temperature corresponding to the menu selected, and if the temperatures are equal the magnetron is deenergized (step 80), and the counter circuit means 30 is reset by generation of signal D (step 82). If the cooking temperatures are not equal in step 78, the cooking time counter maintained by the microcomputer is examined (step 84) and compared to the preset safety or default time (step 86). If the two times are equal, the magnetron is de-energized and an A pulse is generated and fed to the counter circuit means 30 (step 88). In step 92, the program checks to see if the currently generated A pulse is the fifth pulse so generated (i.e., check to see if pulse C is received), and if so, generates a signal for display means 5 to display the error message (step 94).

Upon noticing the fault indication in the display means 5, the operator may check the sensor and clean it to remove dirt build-up. Alternately, the user may exchange the sensor for a new one. Thus, the cooking apparatus will be able to be easily repaired in the event of sensor malfunction.

Since the apparatus informs the user of a sensor defect only when the sensor fault pulse signal is generated five times, the apparatus is highly reliable and does not provide fault indications for temporary sensor abnormalities, such as resulting from an outbreak of steam.

Further, as the back-up power source 32 is connected with counter circuit means 30, the circuit 30 can continue to memorize the number of sensor fault pulse signals A, even if the commercial power source 54 is not supplied for the circuit 30, for example, owing to the failure of the power supply.

In a broader aspect of the invention, a buzzer may be available as the display means instead of the 8-digit LED. Also the heat cooking apparatus may include other temperature measuring devices instead of the infrared sensor, for example, a ceramic gas sensor.

Further, the counter circuit means may include a static memory-cell instead of the back-up power source for memory retention. It is further evident that the function of the counter circuit means 30 may be incorporated into the program of the microcomputer by maintaining an A counter and incrementing same with each sensor fault pulse signal. The program may periodically check the contents of the A counter (in place of step 92 of FIG. 8) and generate the sensor defect signal in response to a predetermined count in the A counter.

While the invention has been described in reference to a preferred embodiment, it will be understood by those skilled in the art that various modifications may be made without departing from the spirit and scope of the invention as set forth in the appended claims.

What is claimed is:

1. A fault indication circuit for a heating apparatus comprising:
    (a) a sensor for generating a sensor signal indicative of the temperature of products placed in said apparatus during operation thereof;
    (b) a control circuit, including a microprocessor having timing means, said control circuit responsive to said sensor signal for comparing the sensor signal indicative temperature with a predetermined temperature and for generating a sensor fault signal if said sensor signal indicative temperature does not reach said predetermined temperature within a predetermined default time period as timed by said timing means;
    (c) an output control means connected to said control circuit and operative to de-energize said heating apparatus when said fault sensor signal is generated;
    (d) a counter connected to receive said sensor fault signal for incrementing in response thereto, said counter outputting a sensor defect signal in response to a predetermined number of sensor fault signals; and
    (e) output means for outputting an indication of said sensor defect in response to said sensor defect signal.

2. A fault indication circuit as recited in claim 1, wherein said heating apparatus is a microwave oven and further comprises:
    (a) input means for providing a menu input selection to said microprocessor; and
    (b) said microprocessor responsive to said selected menu input for determining said predetermined temperature.

3. A fault indication circuit as recited in claim 2, wherein said microprocessor is further responsive to said menu input selection for determining said predetermined default time.

4. A fault indication circuit as recited in claim 1, wherein said predetermined number of sensor fault signals is at least two.

5. A fault indication circuit as recited in claim 1, wherein said predetermined number of sensor fault signals is five.

6. A fault indication circuit as recited in claim 4, wherein said microprocessor is operative to reset said counter whenever said compared sensor signal indicative temperature is equal to said predetermined temperature within said predetermined default time period, whereby proper operation of said sensor effectively resets said counter.

7. A fault indication circuit as recited in claim 6, wherein said heating apparatus is a microwave oven and further comprises:

(a) input means for providing a menu input selection to said microprocessor; and (b) said microprocessor responsive to said selected menu input for determining said predetermined temperature.

8. A fault indication circuit as recited in claim 7, wherein said microprocessor is further responsive to said menu input selection for determining said predetermined default time.

9. A fault indication circuit as recited in claim 1, wherein said sensor is an infrared sensor.

10. A fault indication circuit as recited in claim 1, wherein said output means comprises a display means having an 8-*segment light-emitting display.*

11. A fault indication circuit as recited in claim 1, wherein said output means comprises an audible alarm.

12. A fault indication circuit as recited in claim 1, wherein said counter is maintained by a microprocessor as an internal register or memory location thereof.

13. A fault indication circuit as recited in claim 1, wherein said output control means comprises a relay connected to open a power supply line to said heating apparatus.

14. A fault indication circuit as recited in claim 1, further comprising a back-up power source connected to said counter for maintaining the contents thereof in the event of loss of power from a main power supply.

15. A fault indication circuit as recited in claim 14, wherein said back-up power source comprises a rechargeable battery connected in circuit with said main power supply to be recharged thereby.

16. A method of providing a temperature sensor fault indication for a heating apparatus comprising the steps of:

(a) generating a sensor signal indicative of the temperature of products placed in said apparatus during operation thereof;

(b) comparing the sensor signal indicative temperature with a predetermined temperature;

(c) generating a sensor fault signal if said sensor indicative temperature does not reach said predetermined temperature within a predetermined time period;

(d) de-energizing said heating apparatus upon generation of said sensor fault signal;

(e) counting said number of sensor fault signals; and (f) providing a user indication of a defective temperature sensor if the number of counted sensor fault signals reaches a predetermined number.

17. A method of providing a temperature sensor fault indication for a heating apparatus as recited in claim 16, further comprising the step of restarting the counting of said sensor fault signals if said sensor signal indicative temperature is equal to said predetermined temperature within said predetermined time period.

18. A method of providing a temperature sensor fault indication for a heating apparatus as recited in claim 17, wherein said heating apparatus oven and said method further comprises the steps of:

(a) manually selecting a menu for controlling the cooking time and temperature of food products to be placed in said oven; and (b) selecting said predetermined temperature and predetermined time period in response to said selected menu.

* * * * *